(12) United States Patent
Cheeniyil et al.

(10) Patent No.: US 8,051,464 B2
(45) Date of Patent: Nov. 1, 2011

(54) METHOD FOR PROVISIONING POLICY ON USER DEVICES IN WIRED AND WIRELESS NETWORKS

(75) Inventors: Santhosh Cheeniyil, San Jose, CA (US); Krishna Prabhakar, Los Altos Hills, CA (US)

(73) Assignee: Avenda Systems, Inc., Santa Clara, CA (US)

( * ) Notice: Subject to any disclaimer, the term of this patent is extended or adjusted under 35 U.S.C. 154(b) by 906 days.

(21) Appl. No.: 11/959,863

(22) Filed: Dec. 19, 2007

(65) Prior Publication Data

US 2008/0168547 A1 Jul. 10, 2008

Related U.S. Application Data

(60) Provisional application No. 60/876,072, filed on Dec. 19, 2006.

(51) Int. Cl.
*G06F 7/04* (2006.01)

(52) U.S. Cl. ............ 726/3; 726/1; 726/2; 380/247; 380/248; 380/249; 380/250; 705/18; 709/225

(58) Field of Classification Search .................. 726/1, 2, 726/3; 709/225; 380/247–250; 705/18
See application file for complete search history.

(56) References Cited

U.S. PATENT DOCUMENTS

| | | | |
|---|---|---|---|
| 6,851,050 | B2 | 2/2005 | Singhal et al. |
| 2002/0144144 | A1* | 10/2002 | Weiss et al. ................ 713/201 |
| 2004/0122960 | A1* | 6/2004 | Hall et al. .................. 709/229 |
| 2007/0172063 | A1* | 7/2007 | Biggs et al. ................ 380/255 |
| 2007/0208937 | A1 | 9/2007 | Cam-Winget et al. |
| 2008/0069018 | A1 | 3/2008 | Gast |

* cited by examiner

*Primary Examiner* — Edan Orgad
*Assistant Examiner* — Roderick Tolentino
(74) *Attorney, Agent, or Firm* — Schneck & Schneck

(57) ABSTRACT

A method for provisioning client devices securely and automatically by means of a network provisioning system is disclosed. Provisioning occurs before the client is granted access to the network. The provisioning is determined dynamically at the time a client connects to the network and may depend on a multitude of factors specified by data dictionaries of the provisioning system.

20 Claims, 2 Drawing Sheets

METHOD FOR PROVISIONING POLICY ON USER DEVICES IN WIRED AND WIRELESS NETWORKS

CROSS-REFERENCE TO RELATED APPLICATION

This application claims priority from U.S. Provisional Patent Application Ser. No. 60/876,072 entitled "Method for Provisioning Policy on User Devices in Wired and Wireless Networks," filed Dec. 19, 2006 and which is hereby incorporated by reference in its entirety.

TECHNICAL FIELD

This invention relates to the field of network communication and more specifically to the provisioning and enforcement of policy on devices connecting to the network.

BACKGROUND

Currently, protocols exist and are in use to authenticate a user or device, referred to as a client, when the client connects to a network for the purpose of authorizing the use of network resources by the client. If the authentication is unsuccessful, then the network denies access to the client. In order to perform the authentication, the client exchanges authentication and perhaps other credentials with an authorization server (AS). The authorization server decides whether or not to admit the client to the network and then informs the network device to which the client is connected of that decision.

One well-established protocol for this exchange, for both wired (generally Ethernet) and wireless (generally 802.11) network access, is the IEEE 802.1X protocol. With the IEEE 802.1X protocol, the client exchanges credentials with the AS at a time the client connects to the network. To facilitate this exchange between the client and AS before access to the network is granted, the first network device connecting to the client acts as a relay, taking messages sent by the client and forwarding them to the AS, and taking messages from the AS and forwarding them to the client. The 802.1X protocol refers to this network device as the authenticator and refers to the client as the supplicant. The Remote Authentication Dial-In User Service (RADIUS) protocol is widely used for sending messages between the authenticator and the AS. As a result, the AS is usually also a RADIUS server.

The 802.1X protocol does not provide details of how the messages between the supplicant and AS are secured. The protocol does define an extensible protocol called the Extensible Authentication Protocol (EAP) for this purpose. Several EAP methods have been defined and are in use to secure communication between the supplicant and AS including EAP-FAST, EAP-TLS and PEAP. In all of these methods an encrypted, integrity-protected communication channel is established as the initial part of the 802.1X protocol exchange between the supplicant and the AS.

In addition to exchanging 802.1X protocol messages with the supplicant, the AS also exchanges RADIUS messages with the authenticator in order to inform, or provision, the authenticator with the configuration required for it to implement the resulting policy decision. Originally, the policy decision comprised a simple, binary permit or deny decision. However, with today's more sophisticated network uses and diverse client population, the policy decision can be a rich one, specifying complex access rules and also levels of service quality that should apply to messages to or from the client. Examples of policy that the authenticator might enforce include the VLAN to assign the client to, access control filters to apply to the clients packets, how much bandwidth to allocate to the client, and what priority to give the client's packets. Furthermore, this policy is often dynamically determined based on a multiplicity of factors such as location, time-of-day, and the type of client device.

In today's dynamic networks with their more sophisticated access control requirements, it is beneficial to provision the client with some of the policy decisions so that it can make decisions locally that match the level of access and level of service the network has authorized. However, there is currently no method for provisioning the client that does not require full network access or that uses the AS to determine the appropriate policy dynamically rather than a static configuration on the client itself or at a configuration server.

Therefore, it would be desirable to provide dynamic provisioning of a client with policy decisions or other information before network access is granted.

SUMMARY OF THE INVENTION

In an exemplary embodiment, the present invention is a method of granting network access to a client in a communications network. The method comprises receiving information from the client for determining a network access policy decision, routing the information from the client to an authentication server through a network access device, provisioning access to the network to the client, sending information containing the provisioning access via a secure and authenticated channel to the client, and pushing the network access policy for the client from the authentication server to the client.

In another exemplary embodiment, the present invention is a computer readable medium having embodied thereon a program where the program is executable by a machine to perform a method to grant access to a client in a communication network. The method comprises receiving information from the client for determining a network access policy decision, routing the information from the client to an authentication server through a network access device, provisioning access to the network to the client, sending information containing the provisioning access via a secure and authenticated channel to the client, and pushing the network access policy for the client from the authentication server to the client.

In another exemplary embodiment, the present invention is a system to grant network access to a client in a communications network. The system comprises an authentication server adapted to couple to the network and configured to receive information from one or more client device and grant provisioning access to the one or more clients to the network and a network access device configured to be in communication with the authentication server and form an encryption tunnel adapted to accept the one or more client devices.

In another exemplary embodiment, the present invention is a system for granting network access to a client in a communications network. The system comprises an authentication means for coupling to the network, receiving information from one or more client device; and granting provisioning access to the one or more clients to the network. The system further comprises a network access means for forming an encryption tunnel adapted to accept the one or more client devices and providing communications between the authentication means and the one or more client devices.

BRIEF DESCRIPTION OF THE DRAWINGS

FIG. 1 shows a relationship of three devices participating in an exemplary protocol exchange of the present invention.

DETAILED DESCRIPTION

An exemplary method is described for pushing policy to a client device at a time the client device authenticates with a network by extending an exchange of data between the supplicant and the AS, for instance, as in an 802.1X protocol exchange. Furthermore, the protocol exchange takes place inside an authenticated and secure communications channel that is established as required for the 802.1X protocol authentication exchange. While the discussion herein focuses on the 802.1X protocol exchange, a person of skill in the art will recognize the methods and systems described herein may be implemented in other protocols as well.

Figure 1:
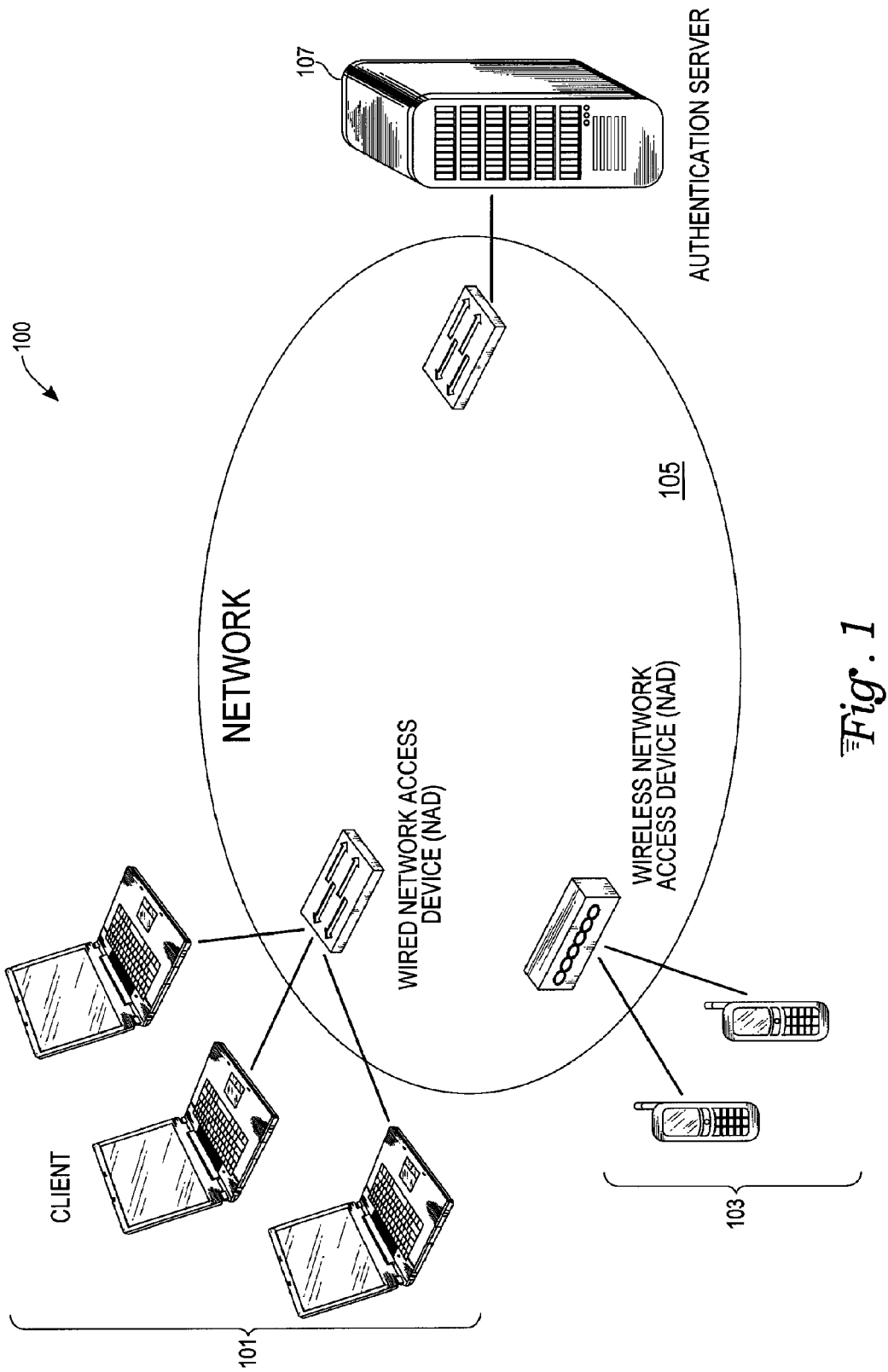
FIG. 1 is a diagram illustrating a high level overview of a network according to an exemplary embodiment of the present invention.

With reference to FIG. 1, a high level system overview 100 of a network 105 includes one or more client devices 101 used to access the network 105 through a wired network access device (NAD). The one or more client devices 101 could be, for example, notebook or desktop computers. The overview 100 further includes one or more client devices 103 used to access the network 105 through a wireless access device. The one or more client devices 103 could be, for example, personal data assistants (PDAs) or cellular phones capable of Internet access. Each of the various wired and wireless devices, plus others, are known to a skilled artisan. Each of the client devices 101, 103, attempts access to the network 105 through the wired or wireless NAD and an authentication server 107. The authentication server 107, along with a method for accessing the network 105, is described in detail, below.

The system and method may be implemented, for example, by software, firmware, or a processor-readable medium having stored thereon instructions which, when read, cause a process (or other electronic devices) to perform a process or method. The processor-readable medium may include, but is not limited to, floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or any other type of media/processor-readable medium suitable for storing electronic instructions. Moreover, the processor-readable medium may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, as described herein, a carrier wave shall be regarded as comprising a computer-readable medium.

Not only is the present invention good for provisioning a policy decision, but various embodiments of the present invention can also be used to push to the client any configuration information that might be necessary or beneficial in an automated way.

In some embodiments of the present invention, the client device 101, 103 connects to a network access device and authenticates with the AS 107 using the 802.1x protocol. The 802.1x protocol is described below in terms of six exemplary phases.

Figure 2:
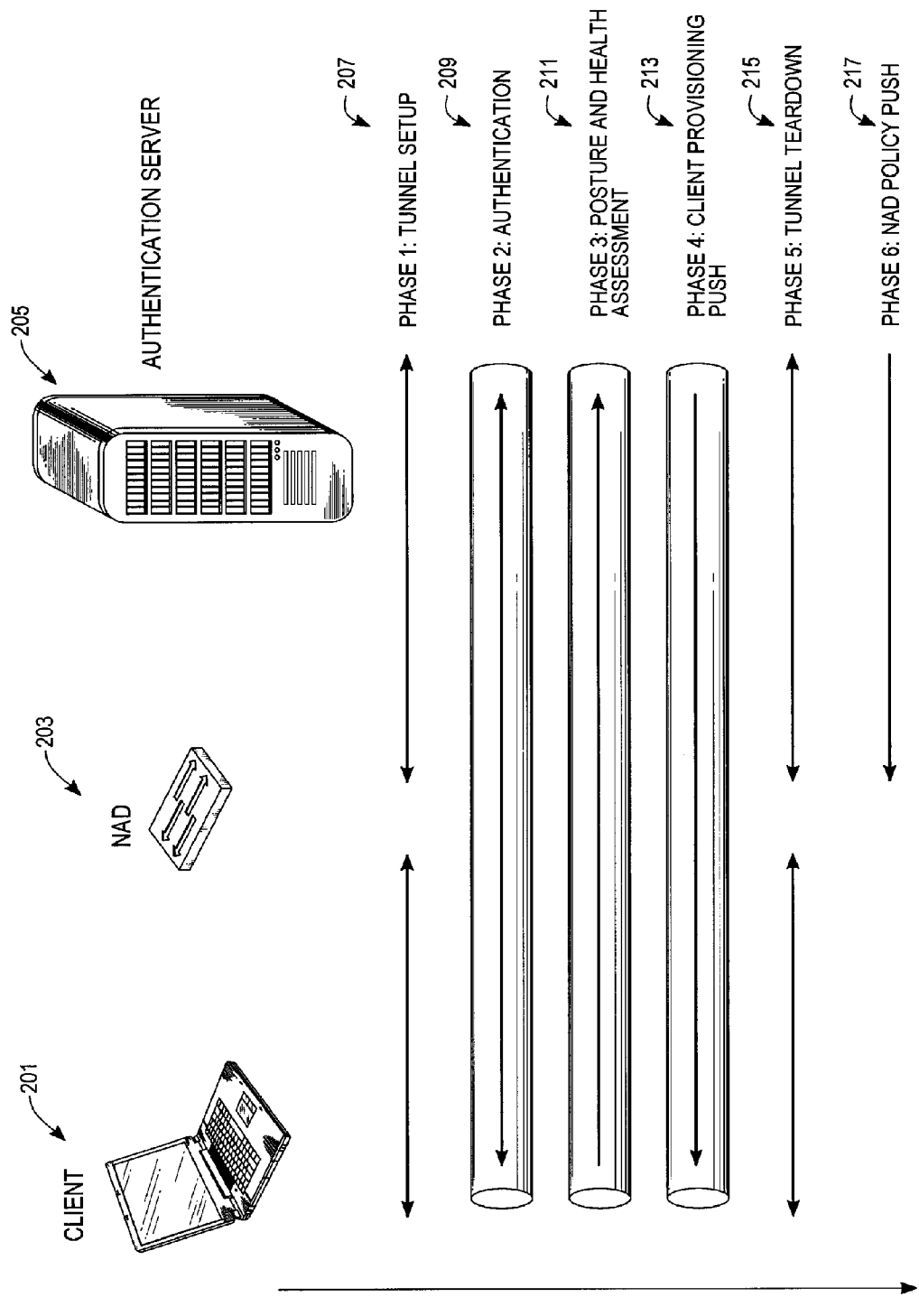
FIG. 2 illustrates an exemplary protocol exchange between the three devices of FIG. 1 participating in the exchange.

Referring to FIG. 2, in phase 1 207, messages are exchanged between a network access device (NAD) 203 and a client 201 and then between the NAD 203 and an AS 205 in order to set up an encrypted tunnel between the client 201 and the AS 205. (Note that the AS 205 may be the same as or similar to the AS 107 of FIG. 1) Some of these messages are exchanges specifically between the client 201 and the AS 205 but are relayed by the NAD 203. The client 201 may be any sort of computing device capable of connecting to a network. For instance, the client 201 may be a personal computer. The NAD 203 may also be any sort of network device capable of acting as an authenticator, such as a wireless access point. The AS 205 may be any network device capable of acting as an authentication server, for instance, a RADIUS server.

In phase 2 209, the AS 205 and the client 201 exchange identity and authentication credentials to mutually authenticate each other. This exchange occurs in the secure tunnel established in phase 1 207. For all messages, the NAD 203 acts as a relay.

In phase 3 211, the AS 205 requests posture and health information, and perhaps other attributes the AS 205 needs in order to make an access policy decision for the client 201. For instance, the information and attributes may include, but are not limited to, operating system (OS) version, OS patch level, firewall status, anti-virus attributes (including version, dat version, etc.), and anti spyware attributes (including version). The exchange occurs in the secure tunnel established in phase 1 207. For all messages, the NAD 207 acts as a relay.

After phase 3 211, the AS 205 decides on the policy to apply to the client 201. As noted above, the policy could include, but is not limited to, specifying complex access rules and also levels of service quality that should apply to messages to or from the client 201. Examples of policy that the authenticator might enforce include a VLAN to which to assign the client 201, access control filters to apply to packets of the client 201, how much bandwidth to allocate to the client 201, and what priority to give the packets of the client 201. Furthermore, the policy is often dynamically determined based on at least one other factor such as location, time-of-day, and/or the type of the client 201 device, etc. since each of these factors influences network access.

In phase 4 213, the AS 205 sends provisioning information to the client 201. The exchange occurs in the secure tunnel established in phase 1 207 which protects the client 201 from being provisioned with, for example, malicious erroneous information. For all messages, the NAD 203 acts as a relay.

In phase 5 215, the tunnel between the client 201 and the AS 207 is torn down.

In phase 6 217, the AS 205 sends policy provisioning information to the NAD 203 so that the NAD 203 can enforce the chosen access policy. The policy is contained in the RADIUS accept message sent by the AS 205 to the NAD 203 as the final message of the exchange. After receiving the message from the AS 205, the NAD 203 sends a final 802.1X message to the client 201 indicating a result (success or failure) of the access control decision.

This six-phase exchange may be repeated periodically. Initiating the repeat exchange may be based on, for example, time. Alternatively, the repeat exchange may be based on some change in the network or may be based on some change in the policy configured at the AS 205.

The exchange of information described above in exemplary phase 4 213 allows for any arbitrary provisioning information to be pushed from the AS 205 to the client 201. This includes operational information and configuration information, as well as network access authorizations.

Examples of provisioning information include but are not limited to: wireless interface parameters such as SSID, power levels and radio channel; quality of service (QoS) parameters such as bandwidth allocations for various traffic types and QoS markings to apply to packets; temporary tokens such as PKI certificates or Kerberos tickets for obtaining access to other network services; speed dial numbers for wireless IP phones; etc. The provisioning information sent to the client 201 may be any arbitrary number of bytes of information. For instance, in addition to the provisioning information described above, in some embodiments where certain types of software (for instance, anti-virus software, etc.) are required for the client 201 by the policy, the AS 205 can send an attribute with the location of the software, which could be downloaded by the client 201 (perhaps using different protocols) upon connection to the network.

In an exemplary embodiment, the provisioning data are specified as a set of attributes and their associated values. These attribute-value pairs are sent to the client 201 in the messages of phase 4 213 of the exchange. In some embodiments, the AS 205 includes modifiable data dictionaries containing the types of attributes that can be provisioned as well as the specific values of these attributes for the various clients. There may be any number of such data dictionaries. Furthermore, these dictionaries might be generic and apply to all clients or they might be client-specific and apply to only specific types of clients, or they may be vendor specific and specify attributes defined by specific vendors. The AS 205 uses these data dictionaries to build the set of attributes to send the client 201 at the time the client is provisioned rather than having this set preconfigured and "hard-wired." Using data dictionaries rather than hard-wired lists allows for maximum flexibility in specifying these attributes and adding new ones as additional capabilities are introduced into the network, without the need for software upgrades or server downtime.

The provisioning that the AS 205 selects for the client 201 may depend not only on the posture, health, and other attributes obtained from the client 201 but, in addition, any other factors such as the location of the client 201, the time, and the type of connection (e.g., wired or wireless) the client 201 is using.

In the foregoing specification, the present invention has been described with reference to specific embodiments thereof. It will, however, be evident to a skilled artisan that various modifications and changes can be made thereto without departing from the broader spirit and scope of the present invention as set forth in the appended claims. For example, although a method of the present invention is described primarily in reference to access to a simplified network, skilled artisans will appreciate that the present invention may also be practiced with a far more complicated network structure. For example, a network with thousands of clients and NADs and numerous authentication servers may use a scaling of the methods provided herein. The specification and drawings are, accordingly, to be regarded in an illustrative rather than a restrictive sense.

What is claimed is:

1. A method of granting network access to an un-provisioned client in a communications network, the method comprising:
    receiving information from the client for determining a network access policy decision;
    routing the information from the client to an authentication server through a network access device acting as an authenticator;
    setting up a secure and authenticated channel between the client and the authentication server through the network access device;
    authenticating the client at the authentication server;
    determining provisioning information and a network access policy relative to granting access to the network to the client;
    sending the provisioning information via the secure and authenticated channel to the client through the network access device;
    tearing down the secure and authenticated channel;
    pushing the network access policy for the client from the authentication server to the network access device; and
    providing client access to the network without further authentication from the authentication server;
    wherein the network access policy and the provisioning information are such that the client has authorized access to the network after the secure and authenticated channel is torn down.

2. The method of claim 1 further comprising performing a health assessment of the client.

3. The method of claim 2 wherein performing the health assessment provides information for making a provisioning decision or an access policy decision for the client.

4. The method of claim 1 wherein:
    setting up a secure and authenticated channel includes forming an encrypted tunnel from the client to the authentication server through the network access device through which the information may be routed; and
    tearing down the secure and authenticated channel includes tearing down the encrypted tunnel after the step of sending the provisioning information to the client.

5. The method of claim 1 further comprising exchanging identity and authentication credentials between the client and the authentication server through the network access device to mutually authenticate one another.

6. The method of claim 1 further comprising establishing access rules for the client.

7. The method of claim 1 further comprising establishing levels of service quality for the client.

8. The method of claim 1 further comprising repeating the method periodically during a communications session.

9. The method of claim 1 wherein the step of determining the provisioning information and the network access policy is performed dynamically.

10. The method of claim 1 wherein the step of sending the provisioning information to the client further comprises determining within the authentication server an acceptable level of security based upon the information from the client.

11. A non-transitory computer readable medium having embodied thereon a program, the program being executable by a machine to perform a method to grant access to a client in a communication network, the method comprising:
    receiving information from the client for determining a network access policy decision;
    routing the information from the client to an authentication server through a network access device;
    setting up a secure and authenticated channel between the client and the authentication server through the network access device;
    authenticating the client at the authentication server;
    determining provisioning information and a network access policy relative to granting access to the network to the client;
    sending the provisioning information via the secure and authenticated channel to the client through the network access device;

tearing down the secure and authenticated channel;
pushing the network access policy for the client from the authentication server to the network access device; and
providing client access to the network without further authentication from the authentication server;
wherein the network access policy and the provisioning information are such that the client has authorized access to the network after the secure and authenticated channel is torn down.

12. The computer readable medium of claim 11 wherein the method further comprises performing health assessment of the client.

13. The computer readable medium of claim 12 wherein performing the health assessment provides information for making a provisioning decision or an access policy decision for the client.

14. The computer readable medium of claim 11 wherein:
setting up a secure and authenticated channel includes forming an encrypted tunnel from the client to the authentication server through the network access device through which the information may be routed; and
tearing down the secure and authenticated channel includes tearing down the encrypted tunnel after the step of sending the provisioning information to the client.

15. The computer readable medium of claim 11 wherein the method further comprises exchanging identity and authentication credentials between the client and the authentication server to mutually authenticate one another.

16. The computer readable medium of claim 11 wherein the step of determining the provisioning information and the network access policy is performed dynamically.

17. A system to grant network access to one or more client devices requesting access to a communications network, the system comprising:
an authentication server configured to receive information from the one or more client devices; and
a network access device configured to be in secure communication with the authentication server and the one or more clients and to form an encryption tunnel between the authentication server and the one or more client devices through the network access device; wherein:
the information from the one or more clients is received at the authentication server via the network access device;
provisioning information granting access to the network is sent through the encryption tunnel to the one or more client devices; and
the provisioning information enables the one or more client devices to have access to the network after the encryption tunnel is torn down.

18. The system of claim 17 wherein the authentication server is further configured to push to the one or more client devices any required configuration information.

19. The system of claim 17 wherein the network access device is further configured to couple communication to the one or more client devices to the authentication server wirelessly.

20. The system of claim 17 wherein the network access device is further configured to couple communication to the one or more client devices to the authentication server via wire connections.

* * * * *